United States Patent [19]

Cannaverde et al.

[11] Patent Number: 5,662,324
[45] Date of Patent: Sep. 2, 1997

[54] HALL EFFECT SENSOR FOR DETECTING DOUBLE FED SHEETS

[76] Inventors: Joseph A. Cannaverde, 131 Perry Ave., New Milford, Conn. 06776; Arnold T. Eventoff, 6 Suzanne La., Pleasantville, N.Y. 10570; Joseph H. Marzullo, 7 Old White Turkey Rd., Brookfield, Conn. 06804

[21] Appl. No.: 359,100

[22] Filed: Dec. 19, 1994

[51] Int. Cl.⁶ ................................................. B65H 7/12
[52] U.S. Cl. ................................ 271/263; 271/265.04
[58] Field of Search .................................. 271/261, 262, 271/263, 265.04

[56] References Cited

U.S. PATENT DOCUMENTS

| | | | |
|---|---|---|---|
| 4,426,785 | 1/1984 | Loftus et al. | 271/12 X |
| 4,934,684 | 6/1990 | Gysling | 271/263 X |
| 5,104,112 | 4/1992 | Briggs et al. | 271/121 |
| 5,145,163 | 9/1992 | Cowan et al. | 271/162 X |
| 5,195,738 | 3/1993 | Gysling | 271/261 X |
| 5,293,118 | 3/1994 | Grossmann et al. | 271/265.04 |
| 5,437,445 | 8/1995 | Chang et al. | 271/263 |

*Primary Examiner*—Karen B. Merritt
*Assistant Examiner*—Scott L. Lowe
*Attorney, Agent, or Firm*—Lawrence E. Sklar

[57] ABSTRACT

Apparatus for singulating sheets of paper and detecting a double feed. The apparatus includes: a sheet feeder having a feed deck; a separator wheel housing secured to the feed deck; a separator wheel mounted in the separator wheel housing; a stone mount located beneath the separator wheel, the stone mount being secured to the feed deck; a separator stone mounted in the stone mount beneath the separator wheel; a Hall effect sensor located in the stone mount downstream of the separator stone; and a magnet secured to the feeder, the magnet being biased against the Hall effect sensor, whereby the Hall effect sensor can detect feed without being effected by any fluctuations in the feed deck.

4 Claims, 4 Drawing Sheets

HALL EFFECT SENSOR FOR DETECTING DOUBLE FED SHEETS

BACKGROUND OF THE INVENTION

The subject invention relates to feeding of single sheets of paper or the like from a stack of sheets for further processing by folders, printers, copiers or the like. More particularly, it relates to detecting double feed sheets which occur when a sheet feeder fails to properly singulate sheets from the stack.

In printers, copiers, inserters, and similar such systems it is frequently necessary to singulate sheets from a stack of sheets for further processing by the system. Many mechanisms have been developed to perform this singulation function, and, in general, they are effective. A typical sheet feeder is disclosed in U.S. Pat. No. 5,104,112 entitled "Document Feeder Having Reversibly Positioned Direct Drive Separator Assembly Motor" which issued Apr. 14, 1992 to the assignee of the instant invention. However, inevitably such sheet feeders will fail and feed a "double" (i.e. two or more overlapping sheets). Such double feed sheets may jam in the system, requiring operator intervention to clear the jam. Perhaps more importantly, if the sheets contain information or are otherwise unique (e.g. return of canceled checks) then their destruction in a jam caused by a double feed may significantly interfere with operations.

For these reasons it is known to provide such systems with detectors downstream from the sheet feeder to detect double fed sheets before a jam and possible destruction of the sheets can occur. One known method is to use an optical system to measure the transparency of a sheet after it is fed from the sheet feeder. Another known method uses precise, sensitive mechanical switches to detect an increase in the thickness of a fed sheet. Both of these methods for detecting double fed sheets involve precise, difficult adjustments each time the type of sheet to be fed is changed.

It is known to use a Hall effect sensor in a sheet feeder to sense the thickness of a document. However, prior art systems using Hall effect sensors require extensive linkage and thus are very sensitive to fluctuations in the feed deck and to any system vibrations. The prior art Hall effect sensor systems also have a magnet to sensor gap which is very difficult to adjust. Accordingly, the instant invention provides a Hall effect double detect feed system which requires virtually no linkage, overcomes the prior art problems and has virtually no sensitivity to fluctuations in the feed deck or any system vibrations.

SUMMARY OF THE INVENTION

Accordingly, the instant invention provides a sheet feeder for singulating sheets of paper and detecting a double feed. The feeder includes: a feeder housing; a feed deck secured to said feeder housing; a separator wheel housing secured to the feed deck; a separator wheel mounted in the separator wheel housing; a stone mount located beneath the separator wheel, the stone mount being secured to the feed deck; a separator stone mounted in the stone mount beneath the separator wheel; a Hall effect sensor located in the stone mount downstream of the separator stone; and a magnet secured to the feeder, the magnet being biased against the Hall effect sensor, whereby the Hall effect sensor can detect a double feed without being effected by any fluctuations in the feed deck.

DETAILED DESCRIPTION OF THE PREFERRED EMBODIMENT

Figure 1:
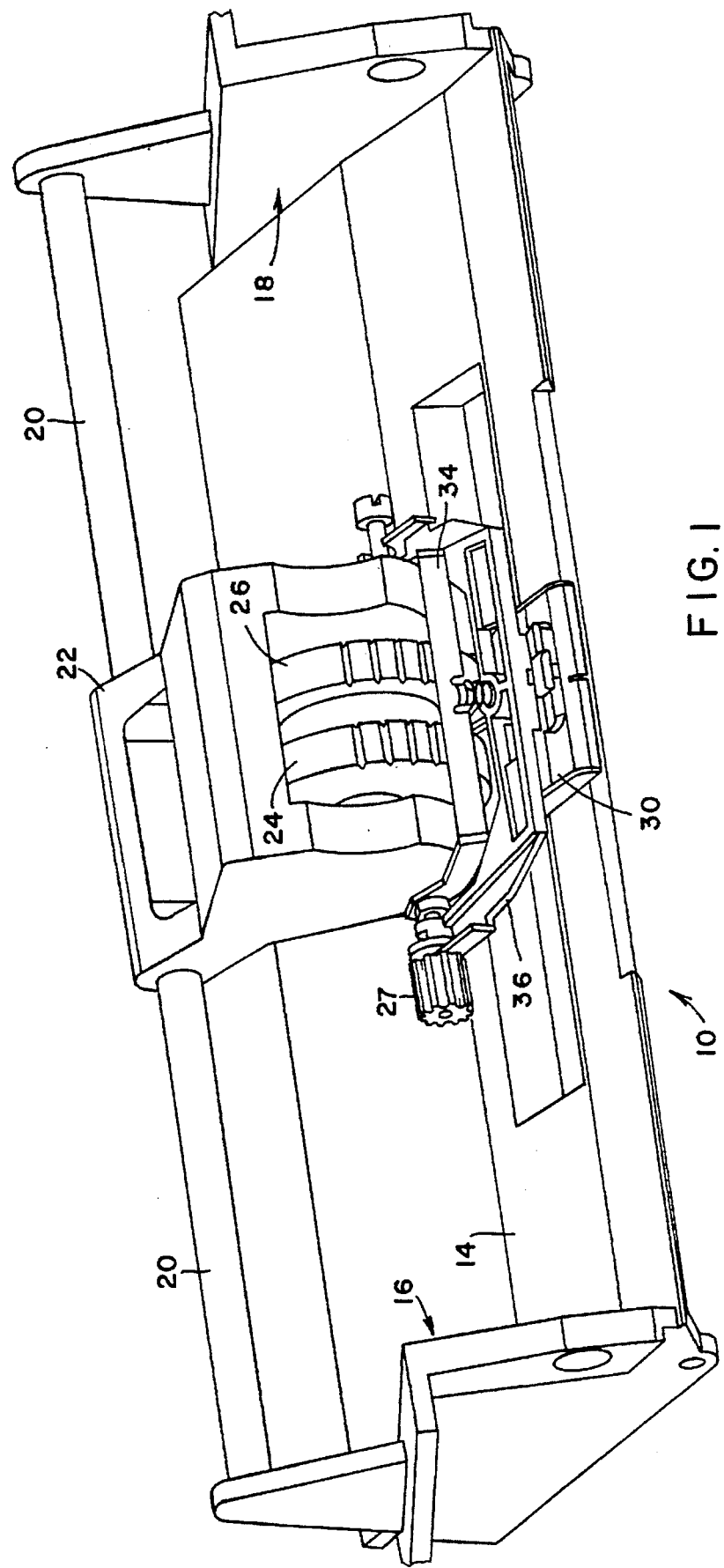
FIG. 1 is a perspective view of the singulating section of a sheet feeder incorporating a Hall effect sensor in accordance with the instant invention.
Figure 2:
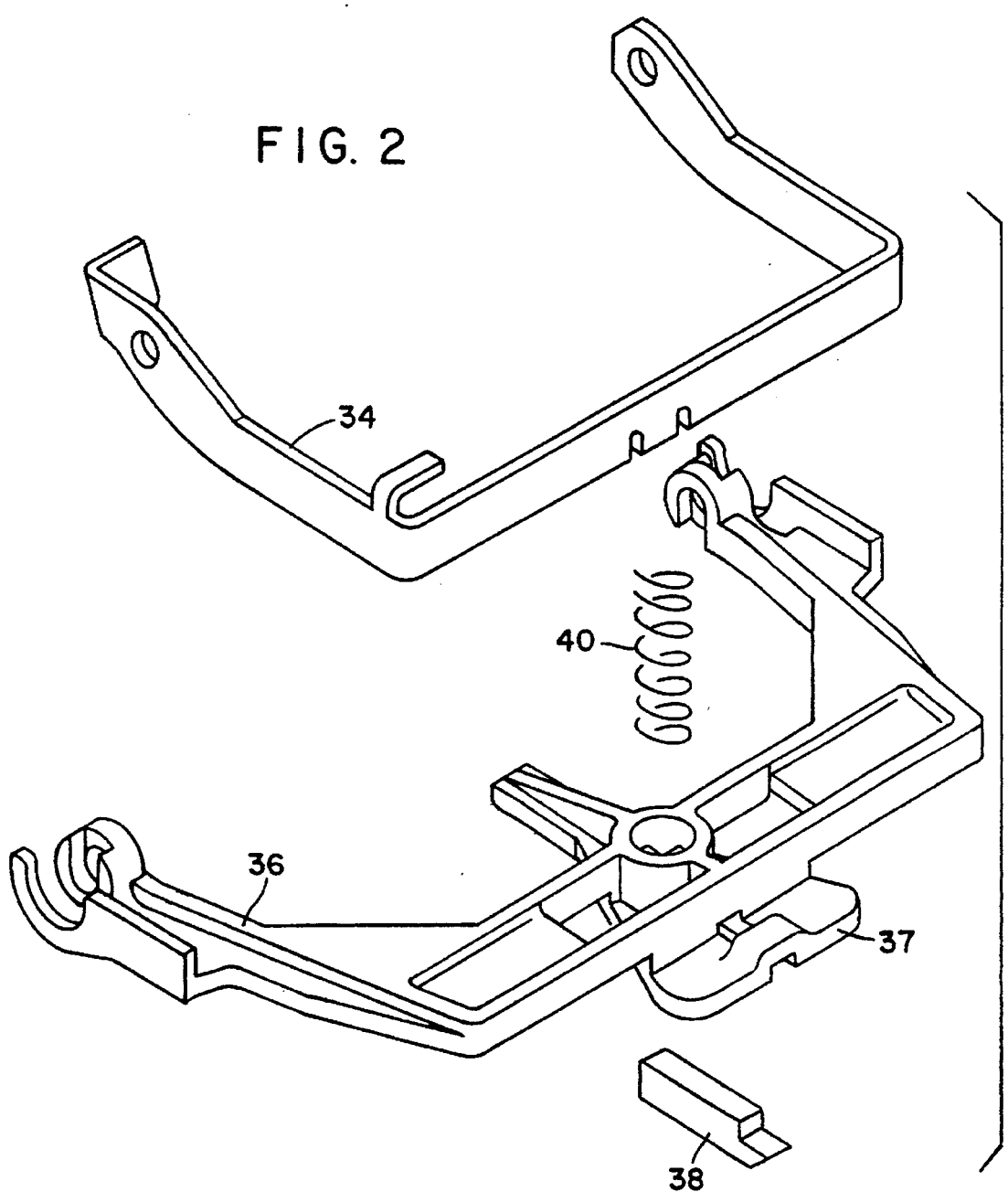
FIG. 2 is an exploded, perspective view of the sensor magnet, magnet ski, spring and spring bracket, bottom to top.
Figure 3:
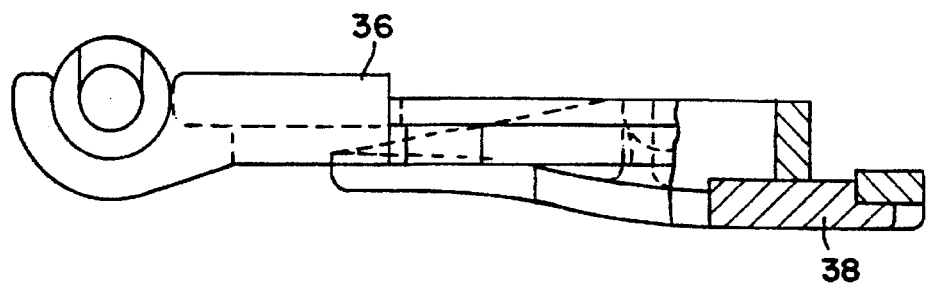
FIG. 3 is a side, elevational view of the ski seen in FIG. 2.
Figure 4:
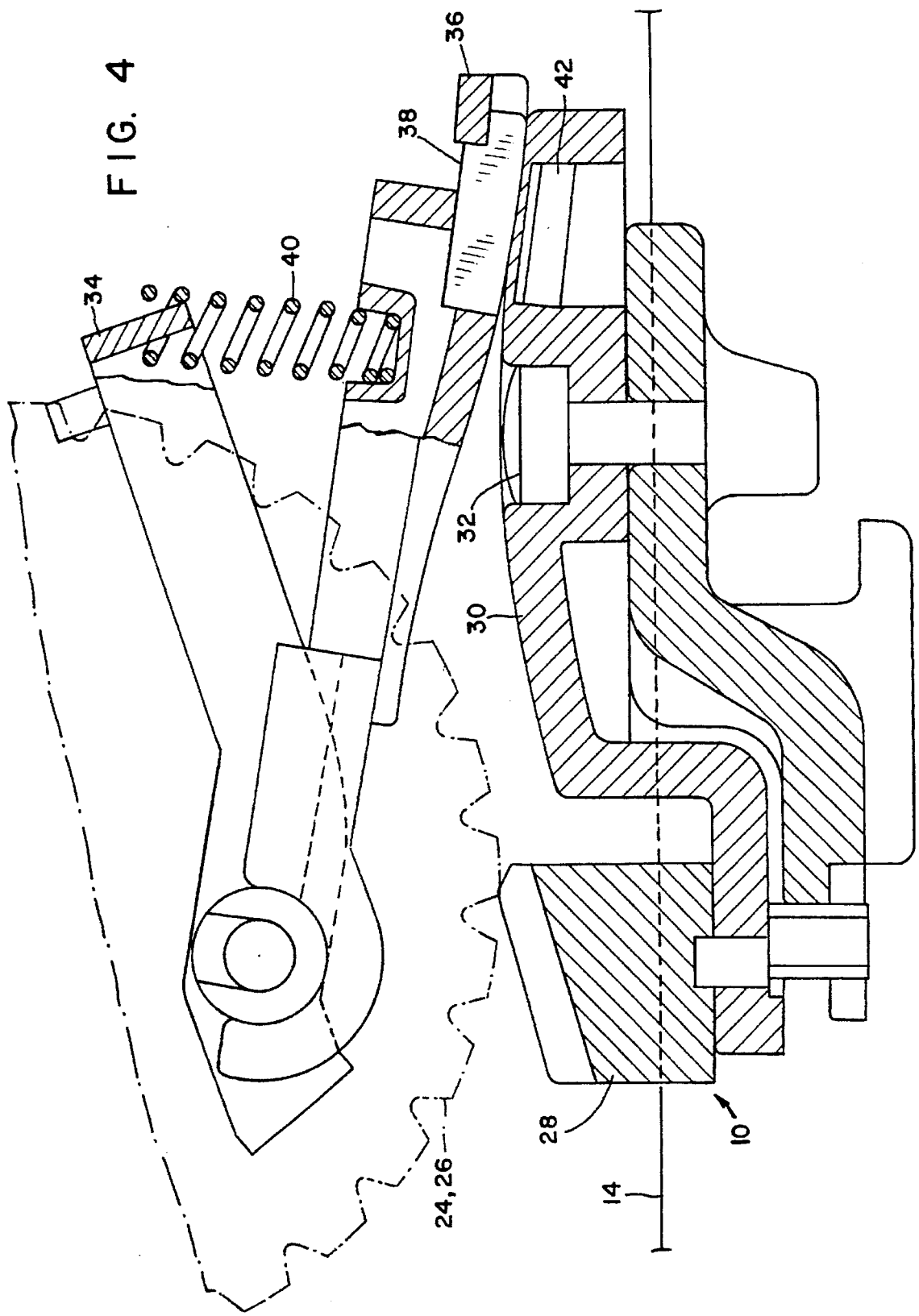
FIG. 4 is a vertical, sectional view of the sheet feeder singulating section and Hall effect sensor and magnet seen in FIG. 1.

In describing the preferred embodiment of the instant invention, reference is made to the drawings, wherein there is seen in FIGS. 1 and 4 the singulating section 10 of a conventional sheet feeder such as disclosed in the aforementioned U.S. Pat. No. 5,104,112. Upstream of the singulating section 10 is a feeder deck 14 (see FIG. 4) for supporting a stack of sheets (not shown) to be singulated. The singulating section 10 also includes housing side members 16 and 18 secured to the deck 14. Extending between the side members 16 and 18 is shaft 20 which supports a separation wheel housing 22. A pair of separation wheels 24 and 26 are rotatably mounted in the separation wheel housing 22. A separation stone 28 is mounted beneath the separation wheels 24 and 26 in a stone mount 30 which is secured to the deck 14 by a bolt 32 and other means. The separation wheels 24 and 26 can be adjusted laterally by means of an adjustment knob 27 which can displace the separation wheel housing 22 laterally.

Fixedly attached at either side of the separation wheel housing 22 is a bracket 34. A low mass ski 36 is pivotably secured to the wheel housing 22 and houses a magnet 38. A spring 40 is seated in the ski 38 and engages the bracket 34 so that the ski 38 with the magnet 38 are biased downwardly.

A Hall effect sensor 42 is mounted in the stone mount 30 and is situated beneath the magnet 38. The electronics (not shown) associated with the Hall effect sensor 42 are mounted on the stone mount 30.

Figure 5:
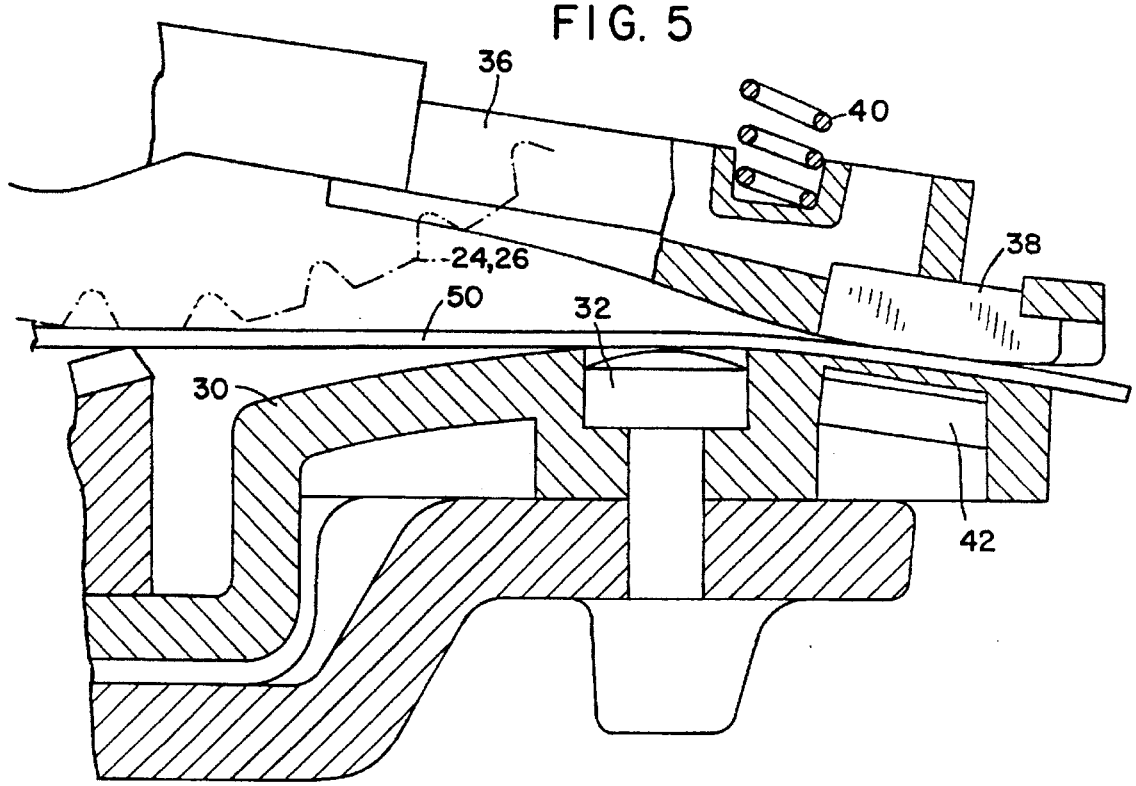
FIG. 5 is similar to FIG. 4 but shows the singulating section feeding a single sheet of paper.
Figure 6:
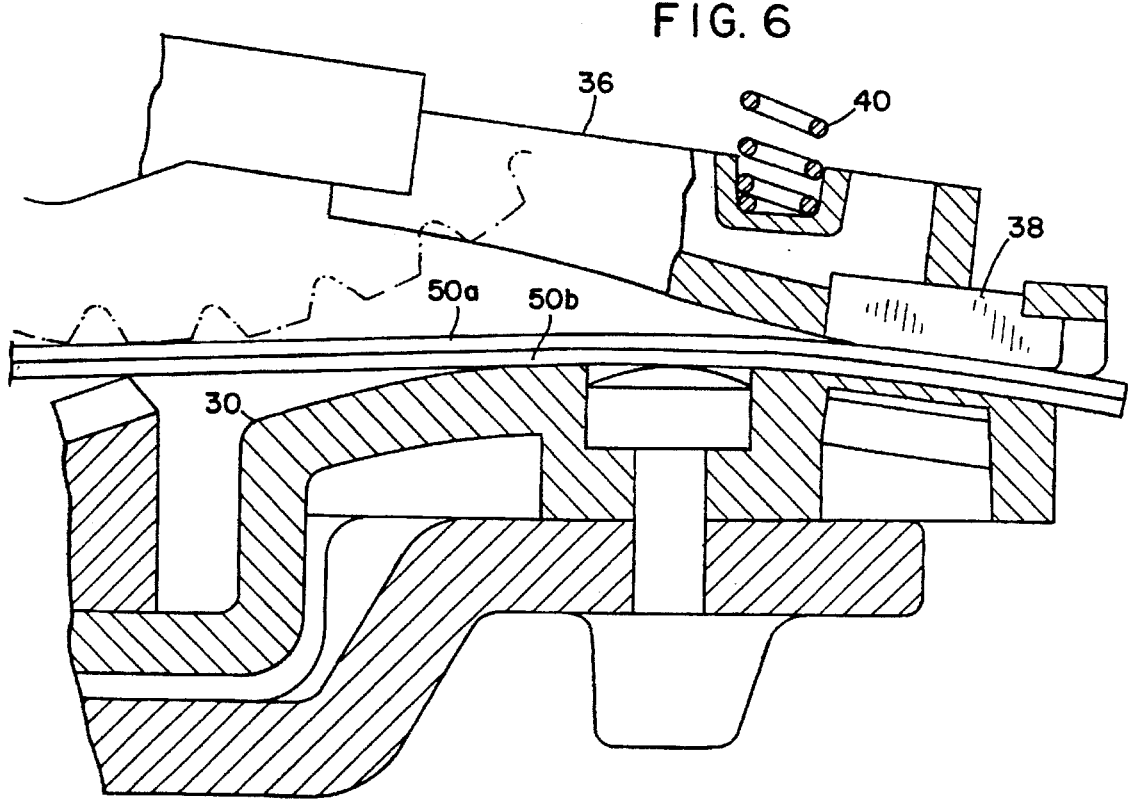
FIG. 6 is the same as FIG. 4 but shows the singulating section feeding two sheets of paper.

In operation, a sheet 50 (see FIG. 5) is fed by the separation wheels 24 and 26 across the surface of the stone mount 30, under which is located the Hall effect sensor 42. The magnet 38 is spring loaded against the surface of the stone mount 30; and as the sheet 50 passes between the surfaces of the magnet 38 and the stone mount 30, a different magnetic field is created which results in a changed electrical output from the Hall effect sensor 42. This output is read by appropriate software. If a pair of sheets 50a and 50b (a double feed) is fed, as seen in FIG. 6, the electrical output of the Hall effect sensor 42 is again changed and the software recognizes a double feed.

From the foregoing description, it can be seen that the output from the Hall effect sensor 42 is insensitive to fluctuations in the deck 14, and owing to the design of the sensor 42 and the magnet 38, them is no need to adjust the gap between the sensor 42 and the magnet 38.

It should be understood by those skilled in the art that various modifications may be made in the present invention without departing from the spirit and scope thereof, as described in the specification and defined in the appended claims.

What is claimed is:

1. Apparatus for singulating sheets of paper and detecting a double feed, comprising:

a sheet feeder having a feed deck;

a separator wheel housing secured to said feed deck;

a separator wheel mounted in said separator wheel housing;

a stone mount located beneath said separator wheel, said stone mount secured to said feed deck;

a separator stone mounted in said stone mount beneath said separator wheel;

a Hall effect sensor located in said stone mount downstream of said separator stone; and a magnet secured to said feeder, said magnet biased against said Hall effect sensor, whereby said Hall effect sensor can detect a double feed without being effected by any fluctuations in said feed deck.

2. The apparatus of claim 1, additionally comprising a bracket secured to said separator wheel housing and a low mass ski pivotably secured to said feeder housing, said magnet being mounted in said low mass ski.

3. The apparatus of claim 2, wherein said bracket and said low mass ski are secured to said separator wheel housing.

4. The apparatus of claim 3, additionally comprising a spring seated in said low mass ski and engaging said bracket to thereby bias said magnet against said Hall effect sensor.

* * * * *